United States Patent
Kuklo

[11] Patent Number: 5,941,132
[45] Date of Patent: Aug. 24, 1999

[54] CONCENTRIC RING FLYWHEEL WITHOUT EXPANSION SEPARATORS

[75] Inventor: Thomas C. Kuklo, Oakdale, Calif.

[73] Assignee: The Regents of the University of California, Oakland, Calif.

[21] Appl. No.: 08/316,147

[22] Filed: Sep. 30, 1994

[51] Int. Cl.⁶ .................................................. G05G 1/00
[52] U.S. Cl. ............................................................ 74/572
[58] Field of Search ........................ 74/572; 192/103 B, 192/105 BA, 104 B

[56] References Cited

U.S. PATENT DOCUMENTS

| | | | |
|---|---|---|---|
| 3,307,423 | 3/1967 | Dansi | 74/572 |
| 3,683,216 | 8/1972 | Post | 310/67 |
| 3,741,034 | 6/1973 | Post | 74/572 |
| 4,058,024 | 11/1977 | Gordon | 74/572 |
| 4,112,785 | 9/1978 | Brobeck | 74/572 |
| 4,370,899 | 2/1983 | Swartout | 74/572 |
| 4,860,611 | 8/1989 | Flanagan et al. | 74/572 |
| 5,012,694 | 5/1991 | McGrath | 74/572 |
| 5,179,872 | 1/1993 | Pernice | 74/572 |

OTHER PUBLICATIONS

UCRL–JC–110861, A High Efficiency Electromechanical Battery, R.F. Post et al., Jun. 11, 1992.

*Primary Examiner*—John A. Jeffery
*Assistant Examiner*—David Fenstermacher
*Attorney, Agent, or Firm*—L. E. Carnahan

[57] ABSTRACT

A concentric ring flywheel wherein the adjacent rings are configured to eliminate the need for differential expansion separators between the adjacent rings. This is accomplished by forming a circumferential step on an outer surface of an inner concentric ring and forming a matching circumferential step on the inner surface of an adjacent outer concentric ring. During operation the circumferential steps allow the rings to differentially expand due to the difference in the radius of the rings without the formation of gaps therebetween, thereby eliminating the need for expansion separators to take up the gaps formed by differential expansion.

13 Claims, 2 Drawing Sheets

CONCENTRIC RING FLYWHEEL WITHOUT EXPANSION SEPARATORS

The United States Government has rights in this invention pursuant to Contract No. W-7405-ENG-48 between the United States Department of Energy and the University of California for the operation of Lawrence Livermore National Laboratory.

BACKGROUND OF THE INVENTION

Field of the Invention

The present invention relates to flywheels, particularly to concentric, multiple ring rotors or flywheels, and more particularly to a concentric ring flywheel or rotor wherein the adjacent rings are configured to eliminate the need for differential expansion separators between the adjacent rings.

The use of flywheels for the storage of energy has long been known, and the application of flywheels for vehicular use was initialed decades ago. The storage of energy in a flywheel to power an elective vehicle was utilized, for example over forty years ago to operate an electric-drive bus, known as the Gyrobus. In this electric-drive bus, occasional charging stops were required for an electric motor to spin up a heavy steel flywheel, and in motion this flywheel provided energy to power the motor connected to it, which then operated as a generator, to provide electricity to drive other electric motors that turned the wheels of the bus. Using the reversibility of the generator-motor, in slowing down or on downhill runs the bus spun up the flywheel, thereby providing a "regenerative" braking action that at the same time recovered some of the energy expended in driving the bus. The main drawbacks of this Gyrobus were the cumbersome steel flywheel and the cumbersome and expensive power conversion equipment.

The use of flywheels in the form of an electromechanical battery (EMB) was extensively researched in the 1970–1980 time period for use in electric vehicles to reduce the consumption of fuel by internal combustion engines and increase the air quality. It was determined from these efforts that the addition of one or more EMBs to the conventional battery system could greatly improve the performance of the electric vehicles.

With the development of strong, lightweight materials and solid-state electronics, EMBs were again considered for electric vehicle use, as well as for large stationary applications.. Such materials induced fiber composites, with the flywheels, which included contra-rotating rotors each being composed of multiple, concentric rings. For example, compact cylindrical flywheels using unidirectionally wound flexible fibers were developed. U.S. Pat. No. 3,683,216 issued Aug. 8, 1972 to R. F. Post, and No. 3,741,034 issued Jun. 26, 1973 to S. F. Post, exemplify flywheels with multi-ring contrarotating rotors.

Further research and development efforts have been directed to fiber composite flywheels using a multi-ring design. For example, one approach consisted of separate thin-walled cylinders or rings fabricated of filament-wound uni-directional fibers embedded in an epoxy matrix, and the cylinders were coupled together by elastic elements or spring-like mechanical elements that transmit torques but did not transmit strong radial forces. Such an approach, along with an extensive history of flywheel development is set forth in a paper UCRL-JC-110861, "A High Efficiency Electromechanical Battery", by R. F. Post et al, Jun. 11, 1992.

Concentric ring or multi-ring flywheels have unique features that minimize radial tensile stress allowing higher speeds and increased stored energy. However, a difficult aspect of this methodology is that the concentric rings expand differentially with different radius rings. This differential expansion between rings requires the use of expandable separators therebetween to take up the gap formed between adjacent rings. These separators are required to be dynamic components.

While elastic and spring-like elements were utilized to interconnect the cylinders or rings of the flywheel described in the above-referenced paper UCRL-JC-110861, such did not effectively provide for the differential expansion of the various rings, or maintain a torque and centering attachment between the adjacent rings. Recently, an expandable separator/torque coupler between the rings of a concentric ring rotor or flywheel has been developed using an expandable hook ring carbon fiber approach. Such is described and claimed in copending U.S. application Ser. No. 08/316,685, filed Sep. 30, 1994, entitled "Concentric Ring Flywheel With Hooked Ring Carbon Fiber Separator/Torque Coupler", assigned to the same assignee.

While these prior approaches to solve the differential expansion problem of concentric rings rotors or flywheels have been successful, the cost, added weight, etc., associated with expandable separators, is a factor in the overall development of efficient flywheel utilization. Thus, elimination of these additional components while providing a solution to the differential expansion problem associated with concentric ring rotor assemblies, such as flywheel, would be a significant advance in this field of technology. The present invention provides a solution to the differential expansion problem without the use of differential expansion separators. This is accomplished by providing each pair of adjacent concentric rings with matching circumferential steps, whereby spin-up of the concentric rings do not form the gap between rotors produced by differential expansion due to the different radius of the rings, thereby eliminating the need for expansion separators to take up the gap formed by the adjacent concentric rings.

SUMMARY OF THE INVENTION

It is an object of the present invention to provide an improved concentric ring rotor which at least reduces problems associated with differential expansion of the rings.

A further object of the invention is to provide a concentric ring flywheel with differential expansion separators.

Another object of the invention is to provide a concentric ring rotor assembly wherein surfaces of adjacent rings are configured to eliminate gaps therebetween due to differential expansion thereof.

Another object of the invention is to provide a flywheel of a multiple concentric ring type wherein surfaces of adjacent rings are provided with matching circumferential steps which cooperate to eliminate the need for expansion separators between adjacent rings.

Other objects and advantages with become apparent from the following description and accompanying drawings. The invention provides a means for eliminating or at least reducing gaps formed by differential expansion of concentric rings due to the different radius of such concentric rings. By eliminating a gap between concentric rings when rotating at speed, the need for expansion separators is eliminated, while maintaining a torque and centering attachment between adjacent rings. This is accomplished by configuring adjacent surfaces of adjacent concentric rings with matching circumferential steps, such that there is no continuous gap between the adjacent concentric rings during rotation thereof. By elimination of the differential expansion problems of concentric ring rotor assemblies, such as flywheels, the rotor assembly may be fabricated with less components, thereby reducing the fabrication costs. Thus, the concentric ring flywheel of this invention may find extensive use in various energy storage systems, as well as enable the use of rotor assemblies using concentric rings in a variety of applications.

BRIEF DESCRIPTION OF THE DRAWINGS

The accompanying drawings, which are incorporated into and form a part of the disclosure, illustrate an embodiment of the invention and, together with the description, serve to explain the principles of the invention.

DETAILED DESCRIPTION OF THE INVENTION

The present invention is directed to a concentric ring rotor assembly, such as a flywheel, which is constructed to eliminate the problem associated with the gaps formed by differential expansion due to the different radius of each of the concentric rings. By this invention the need for differential expansion separators between adjacent concentric rings is eliminated by the provision of matching circumferential steps formed in adjacent surfaces of the adjacent concentric rings which function to eliminate the gaps formed between the rings. While this invention is particularly applicable to concentric ring flywheels, it can be utilized in other rotor-type applications involving concentric rings which expand differentially due to the different radius of each ring.

Figure 1:
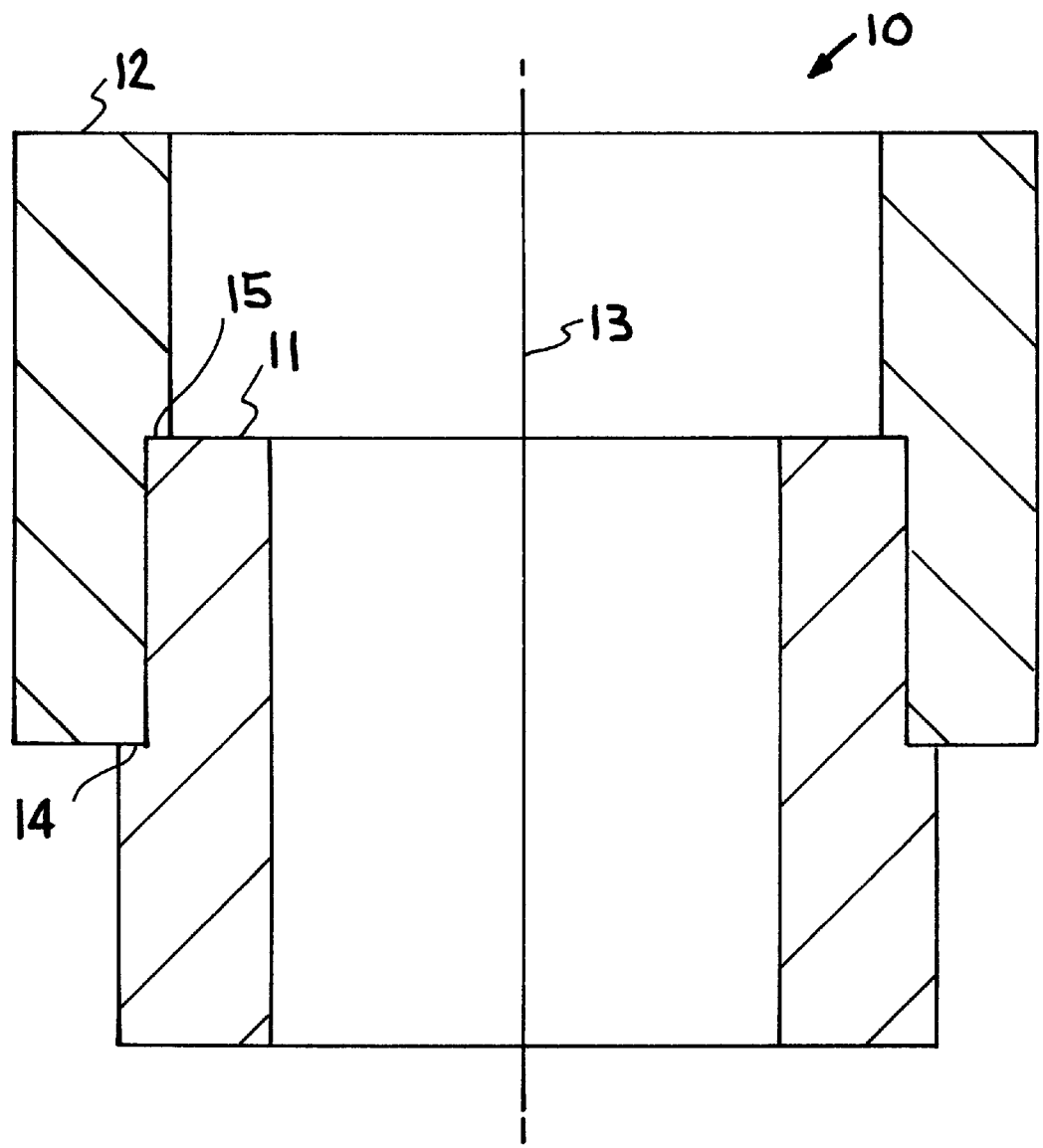
FIG. 1 is a partial cross-sectional view of a concentric ring rotor assembly, configured in accordance with the invention, and with the concentric rings positioned with respect to each other prior to initial rotation around a centerline.
Figure 2:
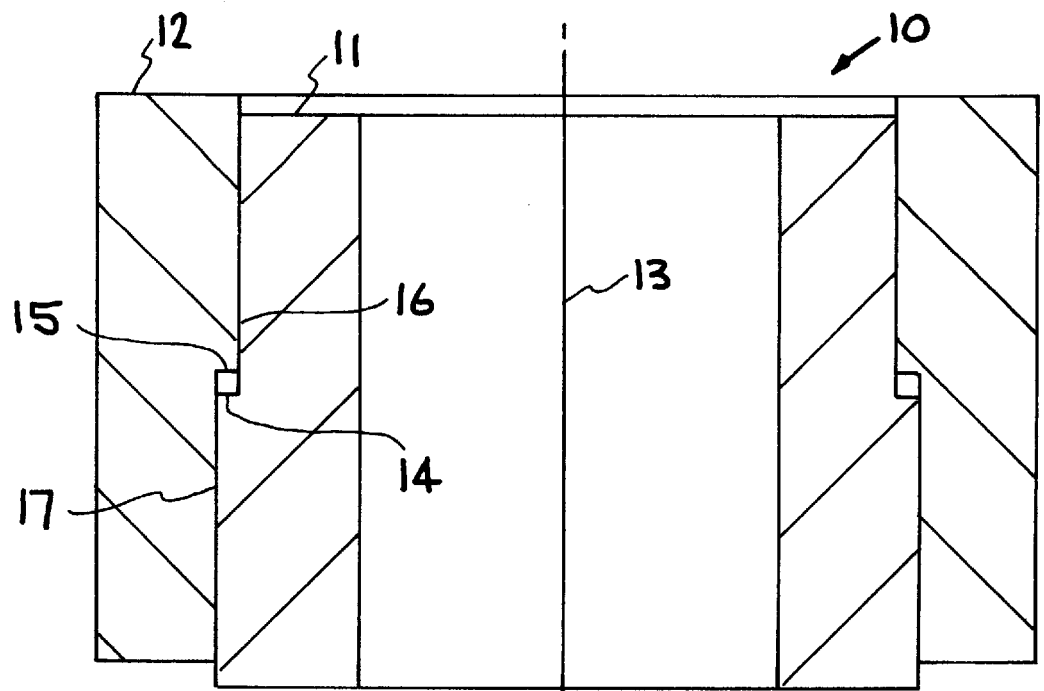
FIG. 2 is a cross-sectional view of the concentric rings of FIG. 1, while rotating about the centerline at operating speed, and with the concentric rings in intimate contact with each other.
Figure 3:
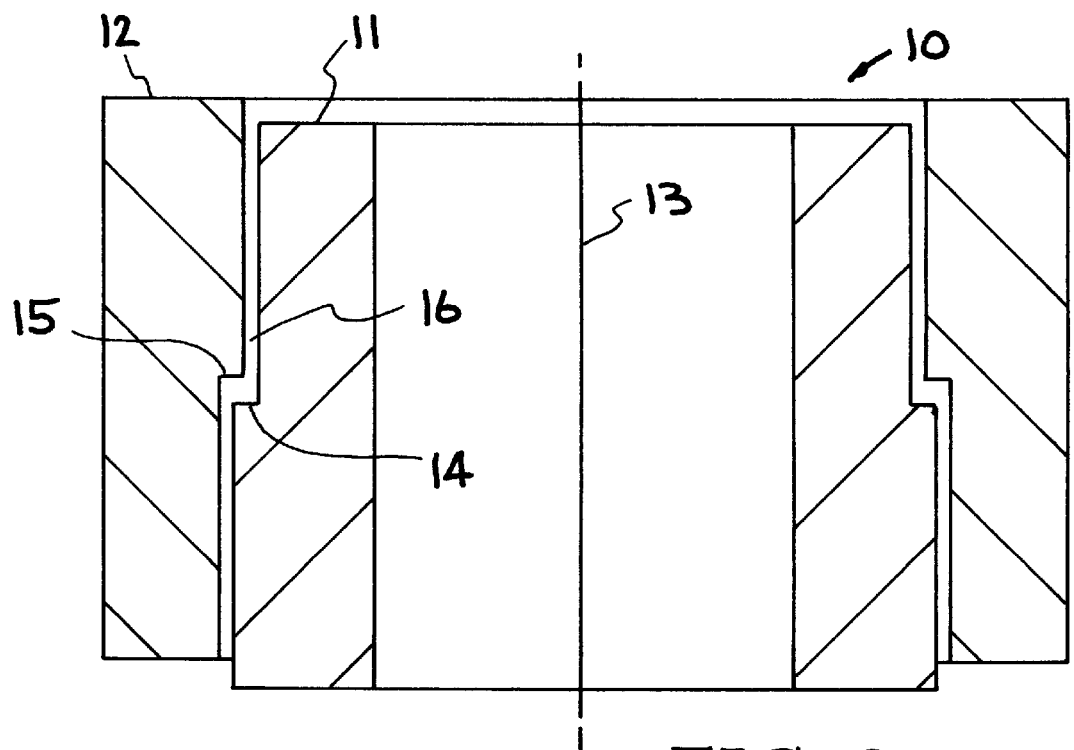
FIG. 3 is a view similar to FIG. 2 except that the concentric rings are operating at overspeed showing radial expansion and defining a continuous gap therebetween, but which gap does not extend at line-of-sight between the rotors.

The invention is illustrated in the drawings, with FIG. 1 showing a pair of concentric rings which extend around an axis or centerline prior to initial rotation of the rings, with FIG. 2 illustrating the position of the rings at operating speed, and FIG. 3 illustrating the rings at over speed showing radial expansion between the rings without a continuous (line-of-sight) gap therebetween. Thus, a rotor assembly made in accordance with the present invention establishes that differential expansion of multiple ring rotors does not require separators of any kind, thus greatly simplifying assembly and substantially reducing the cost of concentric ring rotor systems.

Referring now to FIG. 1, a rotor assembly, such as a flywheel, is generally indicated at 10 and comprises a pair of concentric inner and outer rings 11 and 12 which extend around an axis or centerline 13. Each of the inner and outer rings 11 and 12 is provided with a circumferential step 14 and 15, respectively, on the facing or adjacent surface of the rings, and each ring extends into the adjacent ring a portion of their respective lengths. In this embodiment the matching steps 14 and 15 extend 50% of the length of the rings 11 and 12, and thus each ring extends 50% of its length into the circumferential step of the other ring. These circumferential steps may be formed by machining techniques or formed during the fabrication process of the rings.

During initial spin-ups of the rotor assembly 10, the ring 12 will move outwardly, away from centerline 13, due to differential expansion and the rings 11 and 12 will move so as to be positioned as shown in FIG. 2, wherein the steps 14 and 15 provide matching or cooperating surfaces 16 and 17 in abutting relationship. Upon spin-down, the rings 11 and 13 will be in intimate contact with each other, as shown in FIG. 2, under compressive load due to radial shrinkage. In operation, centrifugal induced stresses will dominate.

Over speed of the rotor assembly 10 results in differential radial expansion of the rings 11 and 12, and a non-line-of-sight gap 18 is formed therebetween, as shown in FIG. 3. However, due to the circumferential steps 14 and 15, the gap is not continuous between the concentric rings (does not extend in a line-of-sight manner), and thus the prior problem associated with such gaps between adjacent rings is eliminated.

By way of example, the concentric rings 11 and 12 may be constructed of filament wound fibers, such as carbon, glass, and Kevlar, and resin systems, such as epoxy, rubber, and glue with inner ring 10 having an internal radius of 1.5, thickness of 1.5 inches, and length of 12 inches, with outer ring 11 having an internal radius of 3 inches, thickness of 1.5 inches, and length of 12 inches, with the circumferential steps 14 and 15 having a depth of 0.010 inch and extending 50% of the length of each of the rings. The step depth to thickness or radius ratio depends on the radial growth a given rotor system is going to have. However, the length of the circumferential steps may vary from about 25% to about 75% of the length of the rings, and the depth of the circumferential steps will vary with the type of ring material, and thickness of the rings and/or radius of the rings, which effect the differential expansion thereof. The factors that govern the step depth are: 1) the engineering units of the rotor material/materials including tensile strength, compression strength, Poisson's ratio, Young's modulus, etc.; 2) the rotor dimensions; 3) the rotor speed. These parameters, per design of the rotor, can all be varied widely. For example, thin rings would require small steps, on the order of a few thousandths of an inch where thick rings would require large steps, on the order of ten thousandths of an inch.

While the invention has been described and illustrated as using only two concentric rings, multiple ring assemblies may be utilized which incorporate the matching circumferential steps on any number of adjacent ring surfaces. Also, while a simple and specific embodiment has been illustrated and described to set forth an understanding of the invention, and specific materials, parameters, etc. have been set forth, such are not intended to be limiting.

It has thus been shown that the present invention provides a concentric ring rotor assembly, such as a flywheel for energy storage applications, which is constructed using circumferential matching steps on adjacent concentric rings whereby the need for expansion separators between the adjacent rings is eliminated. Modifications and changes may become apparent to those skilled in the art, and it is intended that the invention be limited only by the scope of the appended claims.

The invention claimed is:

1. In a concentric ring flywheel, the improvement comprising:

means for eliminating gaps between adjacent concentric rings having facing surfaces and which is caused by differential expansion due to a different radius of each concentric ring, said means for eliminating gaps comprising matching circumferential steps on facing surfaces of the adjacent concentric rings and which extend along a portion of a length of the facing surface, such that said concentric rings are in contact with each other during driving rotation thereof.

2. The improvement of claim 1, wherein each circumferential step extends along 25% to 75% of a length of a concentric ring on which the step is located.

3. The improvement of claim 2, wherein each of the circumferential steps extend along about 50% of the length of the concentric ring.

4. The improvement of claim 2, wherein each of said circumferential steps of a pair of adjacent concentric rings is located along an opposite end section of the adjacent concentric rings.

5. The improvement of claim 1, wherein each of said circumferential steps has a depth in a range of 0.001 inch to 0.010 inch, with the depth of the step being dependent on the material of the adjacent concentric ring and the radius of the adjacent concentric ring.

6. A concentric ring flywheel without differential expansion separators, comprising:

a plurality of concentric rings having facing surfaces and adapted to be rotated about a common axis, each pair of adjacent concentric rings having a matching circumferential step formed in a facing surface of each of the adjacent concentric rings, said circumferential step in one of the pair of concentric rings being located in a displaced position with respect to said circumferential step in another of the pair of concentric rings, such that said pair of adjacent concentric rings are in a position with respect to each other during rotation thereof that a continuous gap extending along the length of the facing surfaces thereof is prevented from forming.

7. The concentric ring flywheel of claim 6, wherein said circumferential step in each of the adjacent concentric rings has a depth dependent on the material and radius of the adjacent concentric ring.

8. The concentric ring flywheel of claim 6, wherein said circumferential steps each have a length extending along about 25% to 75% of a length of the concentric ring in which a step is located.

9. The concentric ring flywheel of claim 8, wherein the length of said circumferential steps of an adjacent pair of concentric rings extends along about 50% of the length of the adjacent pair of concentric rings.

10. The concentric ring flywheel of claim 6, wherein said concentric rings are fabricated from material selected from a group consisting of filament wound fibers and resin systems.

11. The concentric ring flywheel of claim 10, wherein said filament wound fibers includes material selected from a group of carbon, glass and Kevlar; and wherein said resin systems include material selected from a group of epoxy, rubber, and glue.

12. The concentric ring flywheel of claim 6, wherein each of said circumferential steps have a depth of at least 0.001 inch.

13. The concentric ring flywheel of claim 6, wherein each of said circumferential steps have a length and depth determined by the type of material, rotor dimensions and rotor speed.

* * * * *